Oct. 10, 1939.  F. B. HEWEL  2,175,395
DEVICE FOR ATTACHING TIRE CHAINS
Filed June 9, 1937
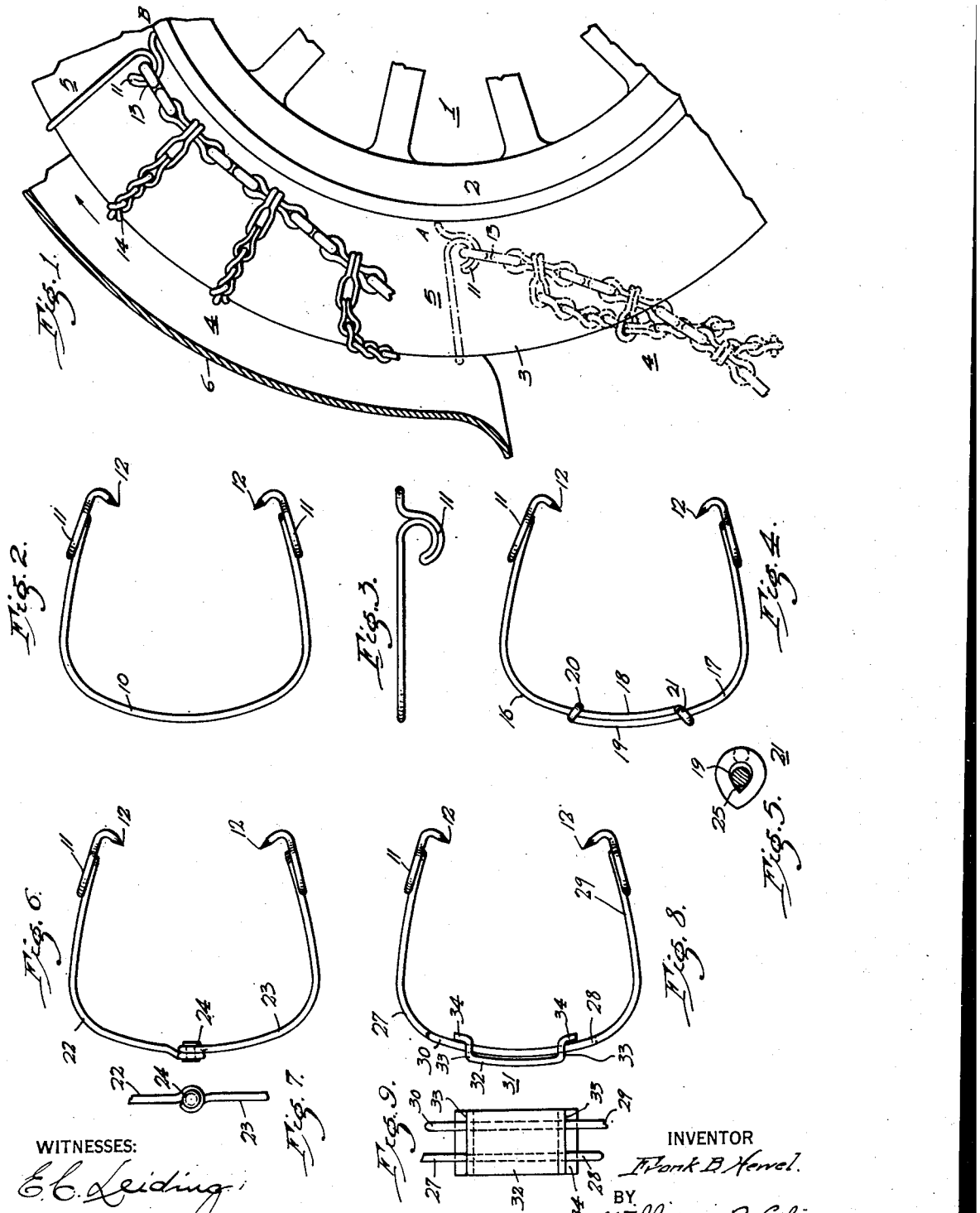
WITNESSES:
INVENTOR
Frank B. Hewel.
BY
William R. Coley
ATTORNEY Patented Oct. 10, 1939

2,175,395

UNITED STATES PATENT OFFICE 2,175,395

DEVICE FOR ATTACHING TIRE CHAINS

Frank B. Hewel, Pittsburgh, Pa.

Application June 9, 1937, Serial No. 147,170

7 Claims. (Cl. 81—15.8)

My invention relates to devices for attaching chains to automobile tires and the like and has for one object to provide a simple and inexpensive but effective device for permitting ready application of tire chains without soiling of the hands or clothing.

Another object of my invention is to provide a tire-chain-attaching device including hook means for engaging portions of the side chains, together with means preferably in the form of sharp points for projecting into the tire casing for anchorage purposes.

Another object of my invention is to provide a tire-chain-attaching device of substantially U-shape for resiliently fitting over a tire and having oppositely-disposed sharp points for projecting into the tire casing near the wheel rim.

A further object of my invention is to provide a device of the character set forth which is capable of adjustment to permit satisfactory application to different sizes of tires.

Other objects of my invention will become evident from the following detailed description taken in conjunction with the accompanying drawing, wherein:

Figure 1 is a fragmentary view of an automobile wheel and tire chain to which my device has been applied;

Figs. 2 and 3 are enlarged views in front and in side elevation respectively of the tire-chain-applying device shown in Fig. 1;

Figs. 4 and 5 are, respectively, a front elevation and a sectional view of a modified form of tire-chain-applying device; and Figs. 6 and 7, and Figs. 8 and 9, relate to further modifications of my device, being, respectively, views in front elevation and fragmentary views in side elevation.

Referring first to Figs. 1, 2 and 3 of the drawing, the structure there shown comprises an automobile rear wheel 1 having the usual rim 2 within which a tire casing 3 is fitted, a tire chain 4 being shown in the process of being applied to the tire by means of the use of my chain-applying device 5. A rear fender 6 (shown in cross-section) occupies the usual position.

In Figs. 2 and 3, the details of the tire-chain-applying device 5 are shown. This device comprises a U-shaped resilient or semi-resilient wire or strip member 10 having in each arm an integral hook member formed of the wire or strip bent back upon itself, these hook members being designated as 11 and each arm of the U-shaped member terminating in sharp points 12 extending towards each other and at substantially right angles to the plane of the corresponding hook member 11.

The application of a tire chain without soiling the hands or clothing through the use of my applying device may be set forth as follows: Initially the tire-applying device 5 is disposed around the tire casing 3 at a point such as A just below the rear end of the fender 6, for example, as indicated in dotted lines, the sharp points 12 being inserted or projecting into the side walls of the tire casing, preferably near the tire rim 2, for anchorage purposes, and the resilient or semi-resilient material of which the device is composed serving in addition to grip the tire casing.

The end links 13 of each of the side chains are then attached to the corresponding hook members 11, as shown in Fig. 1, and the car is driven slowly forward so that the wheel rotates in the direction of the arrow in Fig. 1, and my tire-chain-applying device 5 and the tire chain follow the wheel, the device being shown in solid lines in an intermediate position B near the top of the wheel. Continued forward motion of the automobile causes the remainder of the chain to be applied to the tire, the tire eventually running over the applying device 5 and some of the successive cross chains 14, the vehicle being stopped at approximately the point where the trailing end of the tire chain reaches a position in the neighborhood of the point A, whereupon my chain applicator 5 may be readily removed from the tire and the ends of the corresponding side chains fastened together in accordance with usual practice.

Figs. 4 and 5 show a modified form of the chain-applying device shown in Fig. 2, including overlapping pointed-end arms 16 and 17 of a composite U-shaped member, the overlapping portions 18 and 19 respectively terminating in loops 21 and 20, an enlarged end view of loop 21 being shown in Fig. 5. Each of the loops 20 and 21 has a sharp-angled opening 25 for the purpose of frictionally binding the enclosed portion of the wire. To further enhance this binding action, the loops 20 and 21 are preferably formed at relatively acute angles with the adjacent wire portions, as shown, so that while the total length of the chain-applying device may be readily varied before applying it to the tire, once it is in place the binding action of the illustrated parts will be such as to securely hold it in the desired position.

The device of Fig. 4 thus constitutes one form of my invention in which chains may be applied to tires of different diameters, as described above, with only one applying device being required, and Fig. 8 is another form of such device capable of being applied to tires of various diameters.

Fig. 8 shows separate arms 27 and 29 of a U-shaped applying device having overlapping portions 28 and 30 which are associated with a substantially U-shaped adjustable binding member 31. This device comprises an outwardly disposed base 32 and apertured side walls 33 with end flanges 34, the adjacent and substantially parallelly-extending curved end portions 28 and 30 of the two arms of the device passing through the corresponding apertures in the side walls 33, where they are bindingly held by friction on the curved end portions 28 and 30.

Consequently, by sliding the overlapping portions 30 and 28 to a greater or lesser extent through the U-shaped member 31, the tire-chain applicator may be made of any desired length to accommodate a tire of any given diameter. When the tire runs over the applicator in any of the illustrated forms, no harm results to the tire, by reason of the relatively flat surfaces that are presented to the tire and to the roadway.

Figs. 6 and 7 show a modification of the device of Fig. 2 which may be made to occupy a relatively small storage space. Fig. 6 shows a U-shaped tire-applying device having arms 22 and 23 which are centrally hinged or pivoted together, as indicated at 24, in a plane substantially at right angles to the adjacent parts of the arms 22 and 23 so that, when the device is applied to a tire, it may be opened up and readily placed in position with the sharp points 12 projected into the tire casing, as in the case of the device of Fig. 2; but, when not in use, the device of Figs. 6 and 7 may be folded around the hinge 24 and thus occupy only one-half of the space it requires when in use.

It will be seen that I have thus provided a tire-chain-applying device which is relatively small in size and simple and inexpensive in construction, but which will satisfactorily permit the ready application of a tire chain to a tire without soiling the hands or clothing, and in certain of its illustrated forms the same device may be used for various sizes of tires.

I do not wish to be restricted to the specific structural details set forth herein as still further modifications of my invention may be effected without departing from the spirit and scope thereof. I desire, therefore, that only such limitations shall be imposed thereon as are indicated in the appended claims.

I claim as my invention:

1. A tire-chain attaching device of substantially U-shape comprising end portions each having a hook-shaped part reversed on itself and terminating in a sharp point.

2. A tire-chain attaching device of substantially U-shape comprising end portions each having a hook-shaped part reversed on itself and terminating in a sharp point, said points extending toward each other at substantially right angles to the corresponding hook-shaped parts.

3. A tire-chain attaching device comprising means for engaging portions of the tire chain, means for holding the device to the tire casing, and means comprising overlapping central portions each with a looped end bindingly engaging the other central portion.

4. A tire-chain attaching device comprising means for engaging portions of the tire chain, pointed ends for projecting into the side walls of the tire casing, and means comprising overlapping central portions each with a looped end bindingly engaging the other central portion.

5. A tire-chain attaching device comprising means for engaging portions of the tire chain, pointed ends for projecting into the side walls of the tire casing, and means comprising substantially parallelly extending central portions and a movable binding member for selectively fastening said extending portions together to provide different effective lengths of the device.

6. A tire-chain attaching device comprising means for engaging portions of the tire chain, means for projecting into the tire casing for anchorage purposes, and a central hinge structure for said device.

7. A tire-chain attaching device comprising means for resiliently engaging portions of the tire chain, pointed ends for projecting into the side walls of the tire casing, and a central hinge structure for said device.

FRANK B. HEWEL.